US009231390B2

(12) United States Patent  (10) Patent No.: US 9,231,390 B2
Gardiner  (45) Date of Patent: Jan. 5, 2016

(54) ELECTRICAL ENCLOSURE EXPANDABLE IN THE Z DIRECTION

(71) Applicant: ASCO Power Technologies, L.P., Florham Park, NJ (US)

(72) Inventor: Andrew L. Gardiner, Maine, NY (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 81 days.

(21) Appl. No.: 14/205,013

(22) Filed: Mar. 11, 2014

(65) Prior Publication Data

US 2014/0262491 A1   Sep. 18, 2014

Related U.S. Application Data

(60) Provisional application No. 61/784,000, filed on Mar. 14, 2013.

(51) Int. Cl.
*H02G 3/08* (2006.01)
*H02B 1/40* (2006.01)

(52) U.S. Cl.
CPC *H02G 3/086* (2013.01); *H02B 1/40* (2013.01); *Y10T 29/49817* (2015.01)

(58) Field of Classification Search
CPC ......... H02G 3/08; H02G 3/081; H02G 3/086; H02G 3/14; H02G 1/00; H05K 5/00; H05K 5/02; H05K 5/0204; Y10T 29/49817; H02B 1/40
USPC ......... 174/50, 53, 57, 58, 520, 535, 559, 560, 174/561, 562; 220/3.2–3.9, 4.02; 361/600, 361/601, 610, 641, 679.01, 724, 728, 730, 361/735, 752, 753, 796; 29/592.1, 426.2
See application file for complete search history.

(56) References Cited

U.S. PATENT DOCUMENTS

| | | | | | |
|---|---|---|---|---|---|
| 4,927,039 | A | * | 5/1990 | McNab | 174/57 |
| 5,189,256 | A | * | 2/1993 | Epple | 174/50 |
| 5,910,642 | A | * | 6/1999 | Daoud | 174/57 |
| 6,359,218 | B1 | * | 3/2002 | Koch et al. | 174/50 |
| 6,852,924 | B2 | * | 2/2005 | Lessard | 174/50 |
| 7,038,131 | B1 | * | 5/2006 | Gretz | 174/50 |
| 7,259,328 | B1 | * | 8/2007 | Gretz | 174/57 |
| 7,276,659 | B2 | * | 10/2007 | Thrift et al. | 174/50 |
| 8,017,865 | B1 | * | 9/2011 | Baldwin | 174/53 |

* cited by examiner

*Primary Examiner* — Angel R Estrada
(74) *Attorney, Agent, or Firm* — McDonnell Boehnen Hulbert & Berghoff LLP

(57) ABSTRACT

An expandable electrical enclosure system is presented where expansion collars can be serially added to an existing base box to increase the dimension of the enclosure in only the Z direction. A removable cover can be disconnected and connected as each expansion collar is added.

8 Claims, 3 Drawing Sheets

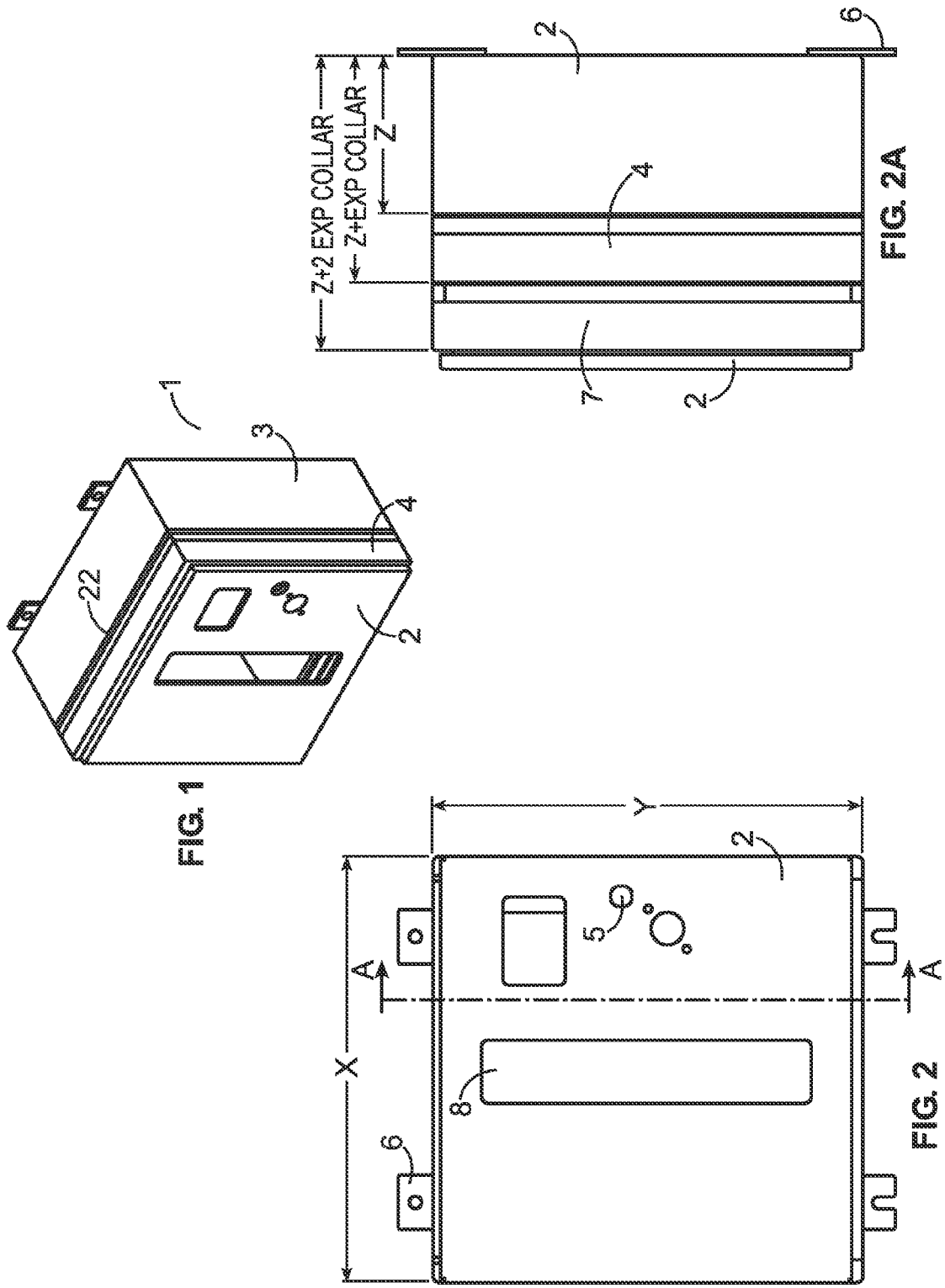

ELECTRICAL ENCLOSURE EXPANDABLE IN THE Z DIRECTION

BACKGROUND

1. Field of the Invention

The field of the present invention relates generally to housings and enclosures for containing electrical and other equipment and more particularly to methods and apparatus for a system of such housings that permits the storage or capacity to be expanded as required without interruption of existing service or having to replace the existing enclosure.

2. Background

Housings for enclosing and protecting electrical equipment are well known in the art. Many different types of electrical equipment must be retained in appropriate housings to protect the equipment from hostile environments from rain, snow, insect damage, animal damage, human tampering, and so forth. For example, in the power industry sensitive electrical equipment, such as surge protectors, must be stored in housings to protect the equipment from the elements, and from tampering.

Enclosures, boxes, and housings commonly used to house electrical equipment are typically mounted on walls that have limited space for multiple boxes. Enclosures are sized based on industry Standards and Safety Codes such as NEC and NFPA. Once equipment is mounted to a wall and wired to a service or branch circuit, it is difficult and expensive to upgrade to modern equipment. Initially, a customer of particular electrical equipment may require only a very limited system. However, as the business of the customer grows, the need for more electrical equipment also grows and therefore a new enclosure must be added or the existing one somehow expanded. When this occurs it may be difficult for the customer to expand their present enclosure in that the existing enclosure is limited in the additional equipment that can be stored in the housing.

As a result, to be prudent the customer must attempt at the time of initially purchasing the electrical equipment or associated system to predict future expanded service requirements at the time of installation. In this manner, the user typically has a larger than required housing installed in order to accommodate the anticipated future requirements. This places an additional burden on the customer in that capital must be allocated at the time of initial installation of the system to cover requirements that are not yet necessary. Also, as technology changes, it may occur that existing housings specifically designed for a particular technology or system, must be replaced with new housings specifically designed to house the new technology.

As such there is a need in the field of the present technology for an electrical equipment housing design that is universal and easily expanded. Also, it is recognized that such expandable housings should maintained the dimension of the originally installed enclosure in the X and Y directions and should only increase the capacity or volume to hold additional or add-on equipment in the Z direction. The housing must be expandable without the loss or interruption of existing service. This invention solves the problems associated with adding electrical components by allowing the expansion of the enclosure in the Z direction without removal of the enclosure and removal of and subsequent rewiring.

These as well as other advantages of various aspects of the present invention will become apparent to those of ordinary skill in the art by reading the following detailed description, with appropriate reference to the accompanying drawings.

SUMMARY

The presently disclosed invention is advantageous in that it allows an upgrade to electrical equipment without having to disconnect wiring and remove the old equipment. Before my invention it was typically necessary to rebuild wiring conduits, raceways, or service entrances. In some cases it was also necessary to rebuild the walls and additional equipment such as distribution circuit boxes, controllers, circuit breakers, and switches. This resulted in down time and added cost. My invention eliminates these prior existing problems by using an enclosure that can be expanded as upgrades are needed. The expansion achieved with my invention maintains the existing nominal X and Y dimensions of the electrical enclosure and allows the Z dimension to be increased by adding one or more expansion collars to the base enclosure. By maintaining the original X and Y dimension of the enclosure this makes it possible to allow existing wiring and peripheral equipment to remain in place. In most cases no downtime of the electrical equipment is needed to expand the enclosure.

The expandable enclosure of my invention allows the opening of the enclosure to be accessed by both opening both the cover and the expansion collar, thus giving more access to the equipment mounted inside for upgrade. The collars can also be designed to accept the cover that was originally fitted and attached to the original base box or base enclosure.

One embodiment of my invention is directed to an expansion collar that is configured to attach to an existing or mounted base box in order to expand the internal volume of an electrical equipment enclosure. The collar defines a frame having a front and a back that is defined by outer dimensions X and Y. The collar also has a ZZ dimension defined as a measured distance from the back of the collar to the front of the collar. The collar is further dimensioned such that the X and Y dimension are substantially the same as the base box dimensions in the X and Y direction. The ZZ dimension of the collar is preferably less than or equal to a distance measured in the Z direction of the base box. The collar can also contain a first connector that is configured to engage a connector on a base box. A second connector can also be included to allow a cover to be removably secured to the collar. Most preferably, because the X and Y dimensions are the same the cover originally connected to the based box can be readily removed and reconnected to the front of collar.

Another embodiment of my invention is directed to an enclosure system that includes a base box, one or more expansion collars and a cover. Each of the collars has the same dimension in the X and Y direction as the base box and cover, but can have a variable dimension in the Z direction. This allows the base box internal space or volume to be enlarged in the Z direction only. So, for example, if the base box is mounted on a wall, then adding one or more collars will grow the enclosure out and away from the wall (i.e., the Z direction), but will not increase the base box footprint on the wall as defined by the X and Y directions. This then allows the base box to remain in place during expansion and the addition of more electrical components.

Yet another embodiment of my invention includes a cover that is removably connected to either the front of the base box or to the front of the collar. The cover can have a connector that is compatible to engage the connector on the base box or a connector on the collar. Preferably all of the connectors are compatible with each other such that they share common components that allow an expansion collar to be connected to the base box in place of the cover or to connect a first collar to a second collar using the same connector on the first collar that connected the cover. Preferably the connectors are configured with components that make up a hinge configuration and are connected together by inserting a common sized hinge pin. The hinge pin can be held in place using a removable split washer, cotter pin, or other fastener that allows a technician to easily remove it so the hinge pin can be removed. The cover can also have one or more observation ports or cutouts that allows a technician to view the internals of the enclosure without opening the cover. Such ports or cutouts are preferably covered with clear glass or plastic to seal out the outside environment.

In some applications it is necessary to seal out environmental elements from the electrical components within the internals of the enclosure and in those situations a gasket can also be included and positioned on the backside of the cover around the periphery such that when the cover is closed a seal is formed with the front face of the base box. The backside of the expansion collar can also have a gasket to form a seal with either the front face of the base box or the front face of a previously attached expansion collar. Preferably a synthetic foam material is used as the gasket material, which is preferably held in place by an adhesive.

In some instances additional electrical components may need to be added to the base box after a first collar has been added that would exceed the available dimension of the enclosure in the Z direction. In such cases a second or a third collar may be added to the first collar where each is attached using the common connector elements. The dimension of the additional collars can be the same as the first collar or smaller or larger when measured in the Z direction. Regardless of the dimension in the Z direction, the dimensions of the additional collars as measured in the X and Y directions are the same as the first collar and the base box.

In one arrangement, the expansion collar preferably has a latch that secures the collar to either the base box or to a previously added collar. Most preferably, the collar latch is the same design as the cover latch, which is preferably a design that allows a technician to use a flat blade screwdriver to turn the latch mechanism to unlock the cover or collar latches. A particular preferred latch is known in the art as a ¼ turn latch. This latch mechanism engages the inside lip of the front face of the base box or the expansion collar. When engaged the cover or collar is held securely in a closed position. When the latch is disengaged the cover or collar can be opened to access the internals of the base box. When a hinge connector is used to secure the cover and collar to the base box or to each other, the latches are located on the opposite side of the connector such that disengaging the latch allows the collar and/or cover to swing open like a door.

In yet another embodiment, my invention is directed to a method of expanding an electrical equipment enclosure in the Z direction where a cover is removed or disconnected from the front of a base box. An expansion collar is then connected to the front of the base box, preferably using the same connector that held in place the cover. The cover is then connected to a compatible connector located on the front of the collar. The expansion collar added to the front of the base box has an X and Y outer dimension that is equal to the dimensions of the base box when measured in the X and Y direction. The expansion collar has a ZZ outer dimension when measured in the Z direction that is less than or equal to the Z dimension of the base box. To further define what is meant by the X, Y and Z direction consider a wall where the horizontal direction is the X direction and the vertical direction is the Y direction. The Z direction would be projecting out of wall at a right angle to both the X and Y directions.

These and other embodiments will become more apparent from a detailed description of several embodiments contained below.

BRIEF DESCRIPTION OF THE DRAWINGS

Exemplary embodiments are described herein with reference to the drawings, in which:

FIG. 1 illustrates a perspective view of one embodiment of the invention showing a base box, one expansion collar and a cover;

FIG. 2 illustrates a front view of an alternative embodiment of the invention where the X and Y dimensions and directions of the base box, expansion collars and cover are designated with arrows;

FIG. 2A illustrates a side view of the embodiment of FIG. 2 where the base box has a depth dimension of Z and the two collars each have a dimension measured in the Z direction of Z+EXP COLLAR;

DETAILED DESCRIPTION

Figure 3:
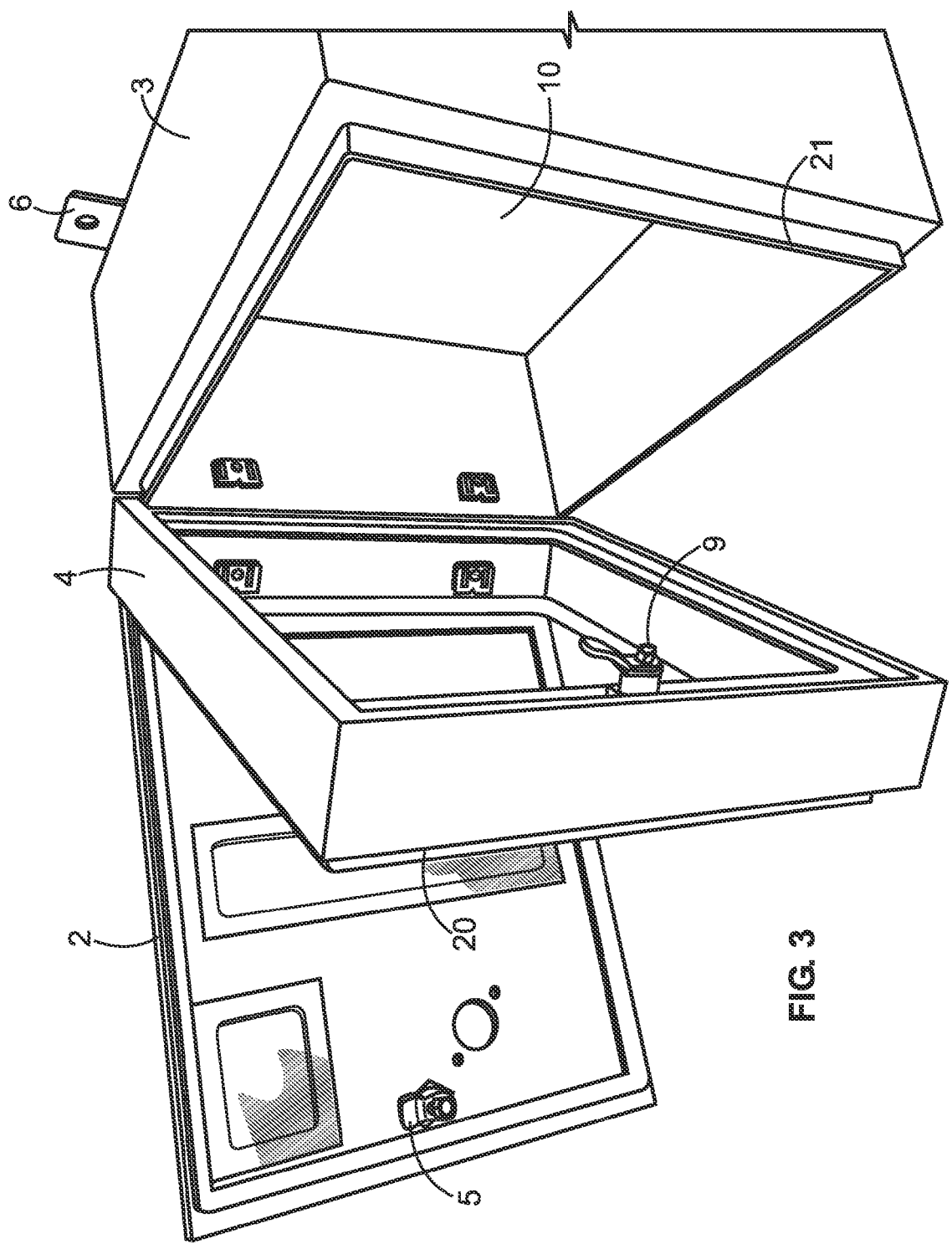
FIG. 3 illustrates a perspective view of the embodiment of FIG. 1 in an opened configuration where the collar and the cover have been swung open to expose the internal volume of the base box.

The expandable electrical enclosure of my invention will now be further described by reference to a several preferred embodiments. The embodiments described below shall by no means be construed as limiting the many possible variations in design of each of the components of my invention. Turning first to FIG. 1 there is shown an expandable enclosure system 1 comprising a base box 3, a cover 2 and an expansion collar 4. Prior to the installation of collar 4 cover 2 was connected directly to front 21 of base box 3. The cover 2 was disconnected from base box 3, the expansion collar 4 was connected to the same connector that held the cover 2 and then cover 2 was connected to connector of the front face 20 (see FIG. 3) of collar 4. The collar shown in the figures comprises a generally square or rectangular frame, however, any shape could be used provided the foot print of the base box as defined by the X and Y planes is matched by the X and Y dimensions of the collar. The cover, base box, and expansion collars can be fabricated out of a number of construction materials, such as metal and plastic or combinations of both, however, sheet metal is the preferred material.

FIGS. 2 and 2A illustrated an embodiment of my system where two expansion collars (4 and 7) have been added to base box 2. As illustrated in FIG. 2 the cover, collars and base box each have the same dimension in both the X and Y directions. However, as shown in FIG. 2A, adding the collars to the front of the base box increases the dimension as measured in the Z direction by the depth of each collar (i.e., Z+EXP COLLAR) or ZZ. In FIG. 2A both of the collars are shown as having the same depth, however, this is not a requirement. Preferably the dimension of the collar as measured in the Z direction is less than or equal to dimension Z of the base box. FIG. 2 also illustrates one or more mounting brackets 6 that can be used to fasten the base box 2 to wall. The cover can optionally contain one or more observation windows 8, ports, or cutouts that are covered or inset with a clear or transparent material, such as, glass or plastic. The cover also preferably has a latch 5 to secure the cover to either the front face of the base box or the front face of the expansion collar.

FIG. 3 illustrates the system where the cover 2 and expansion collar 4 are in an open configuration. This is possible because both the cover and the collar are attached through hinge connector 27 (see FIG. 4). This particular connector configuration allows the cover and the expansion collar to swing open like a door providing access to the internal space 10 of base box 3. FIG. 5 also illustrates latch 5 from the inside surface of cover 2. The particular latch shown is a ¼ turn latch that has a rotating arm that engages and disengages either the front face 21 of the base box or the front face 20 of the expansion collar. Expansion collar 4 can also have a latch 9 that is configured to engage front face 21 of base box 3. Preferably, all latches are the same design. When the latch is engaged the cover or the collar is held shut in a secure manner. When the latch is disengaged the collar or cover can be opened. The cover can be opened alone or opened with the expansion collar.

Figure 4:
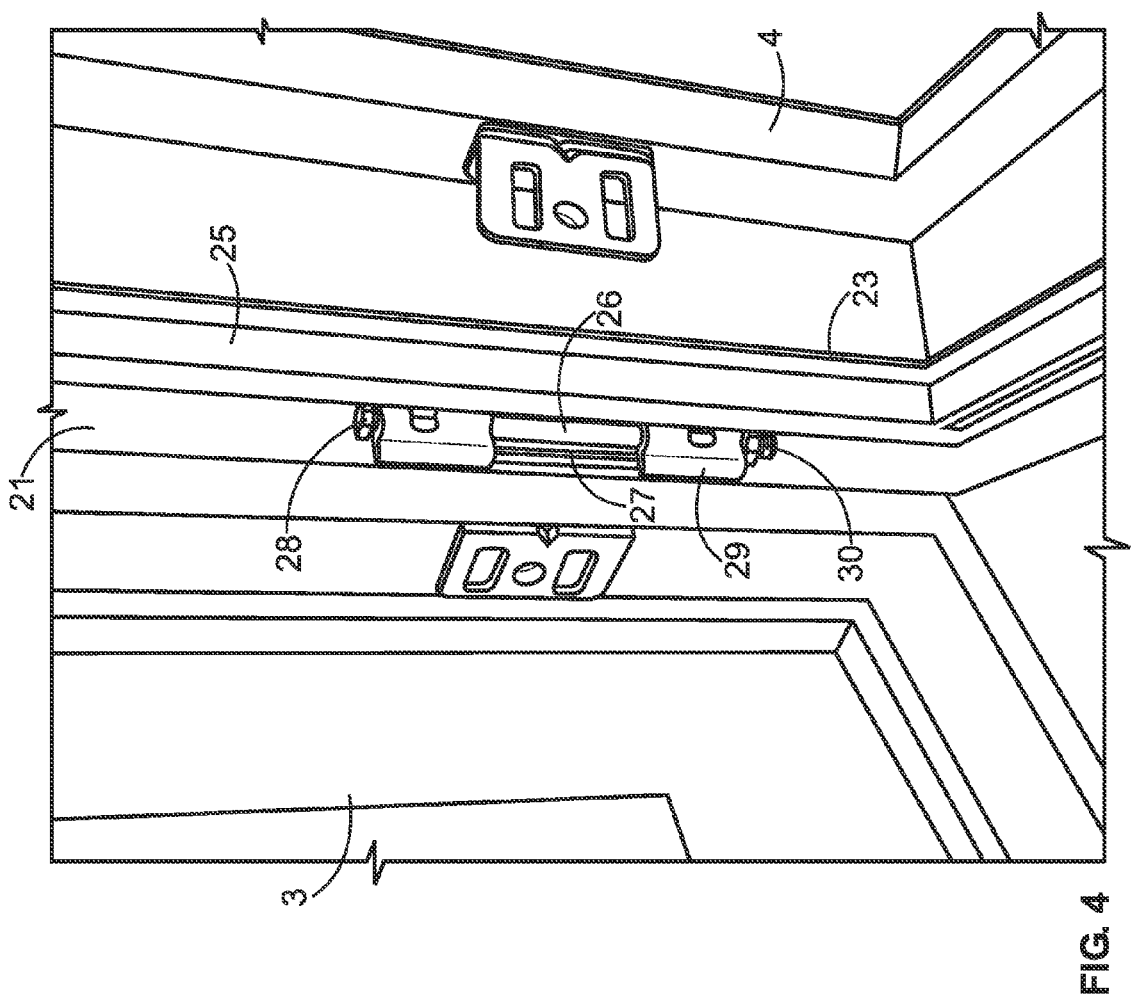
FIG. 4 illustrates a perspective view of the embodiment of either FIG. 1 or FIG. 2 where a first collar is partially opened to show a hinged connector and sealing gasket.

FIG. 4 illustrates one possible configuration of connector 27 that attaches the cover or the expansion collar to base box 3. As illustrated, connector 27 comprises several parts that combine to form a hinged connection. The front face 21 of base box 3 has mounted two hollow barrels 29 and the back side 23 of the expansion collar 4 has mounted one barrel 26. A hinge pin 28 connects the barrels and is secured with a removable split washer 30. Also shown is a sealing gasket 25 located on the back side 23 of collar 4 that is configured to engage with front face 21 of base box 3 to form a seal that protects the contents of the enclosure from the outside environment. A similar gasket can also be used on the inside of the cover to engage either the front face 21 of the base box or the front face 20 of the expansion collar.

Exemplary embodiments of the present invention have been described. Those skilled in the art will understand, however, that changes and modifications may be made to these embodiments without departing from the true scope and spirit of the present invention, which is defined by the claims.

The invention claimed is:

1. An expandable electrical equipment enclosure system comprising,
    a) a base box having a front, a back, and outer dimensions X, Y and Z, the base box having a first hinged connector on the front;
    b) a collar having outer dimensions X and Y and a ZZ outer dimension, where ZZ is less than or equal to Z, where the collar has a second hinged connector configured to attach to the first connector, and where the collar has a third hinged connector;
    c) a first latch positioned on the base collar, the first latch having a first locked mode where the collar and base box are coupled together, and a first unlocked mode where the collar is configured to swing open on the first and second hinged connections;
    d) a cover having a fourth hinged connector configured to attach to the third connector; and
    e) a second latch positioned on the cover, the second latch having a second locked mode where the collar and base box are coupled together, and a second unlocked mode where the cover is configured to swing open on the third and fourth hinged connections.

2. The system of claim 1 further comprises a second collar having outer dimensions X and Y and a ZZZ dimension, where ZZZ is less than or equal to Z, wherein the second collar has a fifth hinged connector configured to attach to the first and third hinged connectors.

3. The system of claim 2 where the second collar has a sixth hinged connector configured to attach to the fourth hinged connector.

4. The system of claim 2 where ZZZ is equal to ZZ.

5. The system of claim 3 where the cover further comprises a gasket that is configured to form a seal with the front face of the base box.

6. The system of claim 3 where the collar has a gasket on a backside that is configured to form a seal with the front face of the base box.

7. A method of expanding an electrical equipment enclosure in the Z direction comprising,
    a) removing a cover from a base box having a front, a back, and X, Y and Z outer dimensions, the base box having a first hinged connector on the front that is configured to removably connect to a second hinged connector on the cover;
    b) adding a collar to the front of the base box, where the collar has X and Y outer dimension and a ZZ outer dimension that is less than or equal to the Z dimension, the collar having a third hinged connector configured to attach to the first hinged connector, and the collar having a fourth hinged connector, where the collar includes a first latch having a first locked mode where the collar and base box are coupled together, and a first unlocked mode where the collar is configured to swing open on the first and second hinged connections;
    c) connecting the cover to the collar via the third hinged connector and the fourth hinged connector, where the collar includes a second latch having a second locked mode where the collar and base box are coupled together, and a second unlocked mode where the cover is configured to swing open on the third and fourth hinged connections.

8. The method of claim 7 further comprises adding a second collar to the collar to increase the outer dimension only in the Z direction.

\* \* \* \* \*